United States Patent [19]

Shapiro et al.

[11] 3,908,945

[45] Sept. 30, 1975

[54] PORTABLE CAMERA MOUNTING APPARATUS

[76] Inventors: Herbert D. Shapiro, 17106 Richard, Southfield, Mich. 48075; George A. Bondi, 34466 W. Nine Mile Rd., Farmington, Mich. 48024

[22] Filed: Feb. 21, 1974

[21] Appl. No.: 444,398

[52] U.S. Cl. ............... 248/165; 248/181; 248/412
[51] Int. Cl.² ................ F16M 11/32; F16M 11/14
[58] Field of Search ........ 248/165, 181, 187, 188.7, 248/48, 150, 411, 412, 159, 151, 431, 432

[56] References Cited
UNITED STATES PATENTS

| | | | |
|---|---|---|---|
| 505,149 | 9/1893 | Weyl | 248/165 |
| 714,043 | 11/1902 | Seitz | 248/181 |
| 1,298,380 | 3/1919 | Owen | 248/48 |
| 1,365,873 | 1/1921 | Waderlow | 248/165 |
| 1,448,171 | 3/1923 | Waderlow | 248/165 |
| 1,883,276 | 10/1932 | Zerk | 248/181 |
| 1,970,624 | 8/1934 | Recker | 248/412 |
| 2,090,783 | 8/1937 | Chinn | 248/165 |
| 2,641,430 | 6/1953 | Secofsky et al. | 248/412 |
| 3,632,073 | 1/1972 | Nakatani | 248/181 |

FOREIGN PATENTS OR APPLICATIONS

| | | | |
|---|---|---|---|
| 359,018 | 1/1962 | Switzerland | 248/412 |

Primary Examiner—Roy D. Frazier
Assistant Examiner—Lawrence J. Staab

[57] ABSTRACT

A portable camera mounting apparatus having a hollow telescopic body structure for supporting a camera. When the apparatus is being used as a support for the camera, the telescopic body structure is extended, the camera is mounted at the top end of the structure by a pivot mount, and the structure is supported by three legs which extend from the bottom end of the structure. When the apparatus is being transported or stored, the camera is removed from the pivot mount, and the telescopic body structure is retracted to a convenient length with both the camera pivot mount and support legs disposed in the hollow interior of the body structure. The telescopic body structure includes stop means to limit its amount of extension and lock means to lock it in its extended position and retracted position, and in any intermediate position.

9 Claims, 5 Drawing Figures

U.S. Patent  Sept. 30,1975  Sheet 2 of 2  3,908,945

3,908,945

PORTABLE CAMERA MOUNTING APPARATUS

BACKGROUND OF THE INVENTION

1. Field of the Invention

The present invention relates to supporting devices which support an article in substantially spaced relationship to a generally horizontal surface such as a table, floor or the ground, and more particularly to structures for supporting cameras and the like.

2. Description of the Prior Art

Various camera mounting devices are known and include body straps and braces, shoulder braces, and monopods, all of which are considered too unstable for fine camera work. The devices also include tripods having folding legs and telescoping legs.

The prior known tripods are relatively complicated, therefore expensive, heavy and unwieldy to carry and store. Thus, there exists a need for lightweight, inexpensive and compact camera mounting apparatus.

SUMMARY OF THE INVENTION

The present invention is a portable mounting apparatus for supporting a camera, which apparatus is simple in construction, lightweight and convertible to a compact form for easy carrying and storage.

The portable camera mounting apparatus of the present invention comprises a hollow telescopic body structure, a camera mount for mounting a camera to the proximal end of the telescopic body structure, and legs removably connected by a leg mount to the distal end of the telescopic body structure to extend therefrom for supporting the apparatus on the ground. When the apparatus is being used to support the camera, the telescopic body member is extended to a desired length, the camera mount is secured to the proximal end of the telescopic structure and the camera attached to it, and the legs are removably connected to the distal end of the body structure to extend therefrom to contact the ground. When the apparatus is being carried or stored, the telescopic body structure is retracted to a shortened length, the camera is removed from the camera mount, the camera mount is inserted into the interior of the telescopic structure at said proximal end, and the legs are placed into the interior of the telescopic body structure at its distal end; thus reducing the apparatus to a short cylinder having the various components of the apparatus positioned in its interior.

The apparatus also includes stop means to limit the extension of the telescopic body structure and a locking means to lock the structure in extended, intermediate and retracted positions.

Thus the invention is a portable camera mounting apparatus adjustable from a first or extended camera mounting position to a second or retracted storage position, said apparatus comprising: (a) an elongated body member which includes a sleeve member, a core member telescopically extendable relative to said sleeve member, and a hollow interior, said body member having a proximal end and a distal end; (b) a camera mount adapted to be reversibly secured to said proximal end and, in said first position, to extend outwardly from said proximal end; and in said second position, to extend inwardly into said interior; (c) a leg mount adapted to be removably secured to said distal end, said leg mount having a first plurality of peripherally spaced, angularly extending, leg receiving cavities which penetrate said mount from points outside said body member; and said leg mount having a second plurality of spaced, parallel, leg receiving cavities which penetrate said mount from points inside said interior; and (d) a plurality of legs adapted, in said first position, to be received into said first plurality of cavities in a manner to provide a support for said body member when in a vertical position and adapted, in said second position, to be received into said second plurality of cavities for storage in said interior.

BRIEF DESCRIPTION OF THE DRAWINGS

The preferred embodiment of the present invention will be described with reference to the accompanying drawings, wherein like numerals refer to like parts throughout the several views and in which.

DETAILED DESCRIPTION OF THE PREFERRED EMBODIMENT

Figure 1:
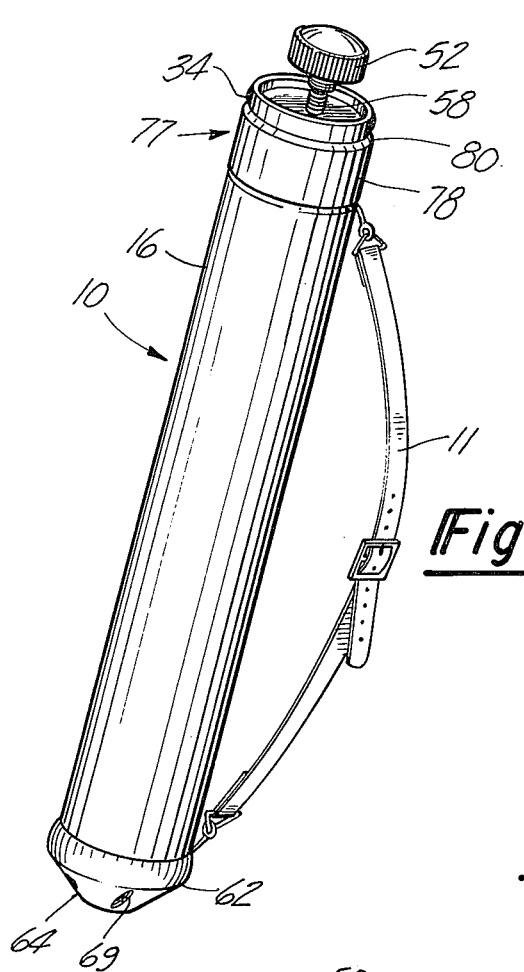
FIG. 1 is a perspective view of the portable camera mounting apparatus in its retracted position.
Figure 2:
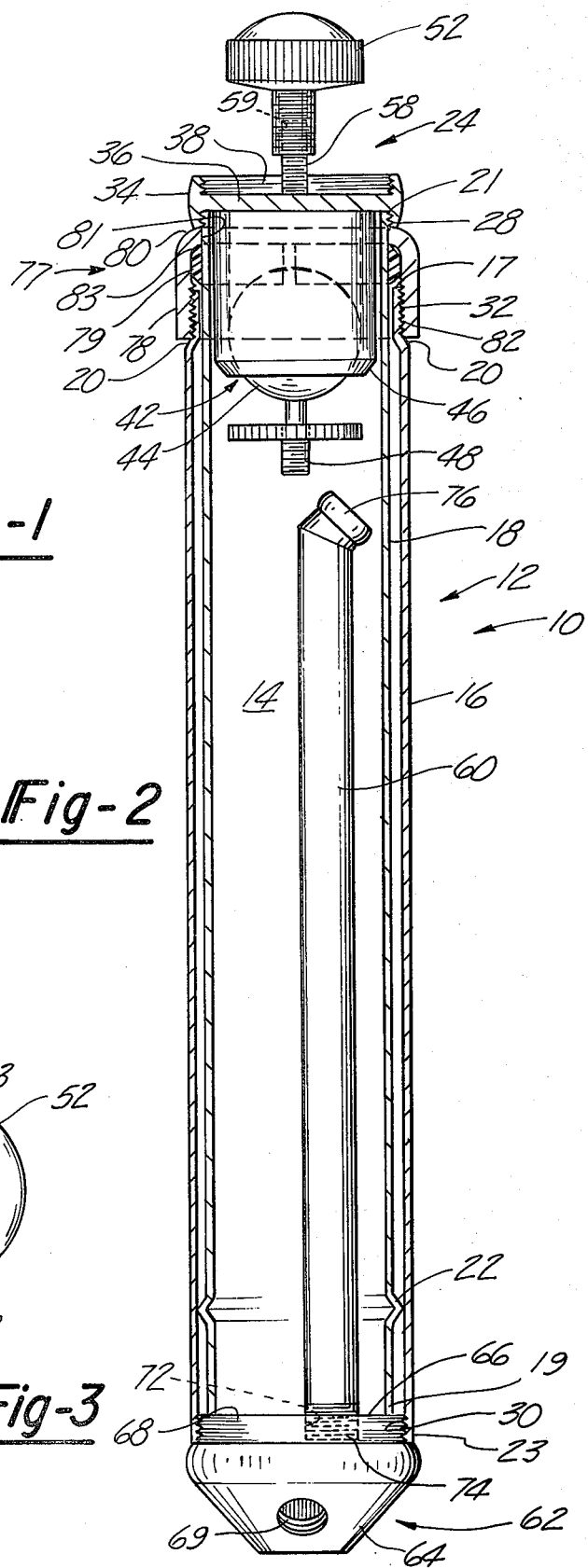
FIG. 2 is a sectional view of the portable camera mounting apparatus in the retracted portable position of FIG. 1.

FIGS. 1 and 2 show a novel portable camera mounting apparatus 10 in a retracted position suitable for carrying or storage. A carrying strap 11, which may be slung over a person's shoulder, is attached to the apparatus 10.

Figures 4, 5:
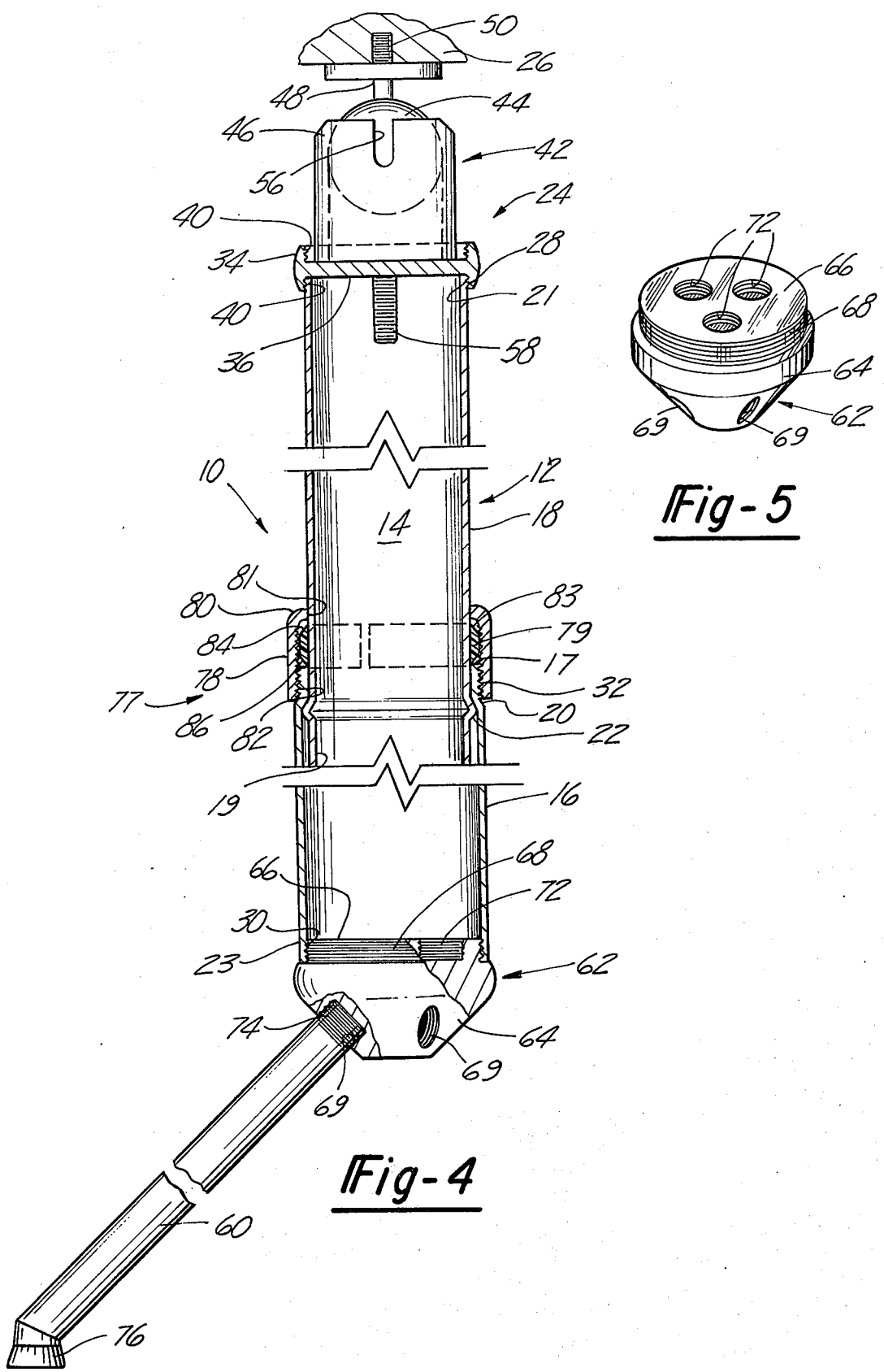
FIG. 4 is a foreshortened sectional view of the portable camera mounting apparatus in its extended position for supporting a camera.
FIG. 5 is a perspective view of a preferred means of mounting legs to the apparatus of the invention.

FIG. 4 shows the novel apparatus 10 in an extended position suitable for stably supporting a camera 26.

As can be best seen in FIGS. 2 and 4, the apparatus 10 comprises an elongated, cylindrical, telescopic body structure 12 having a hollow interior 14, a sleeve member 16 and a core member 18; the core 18 being concentrically mounted within the sleeve 16 for axial movement therein from the extended or first position (see FIG. 4) to the retracted or second position (see FIG. 2).

The telescopic body structure 12 is provided with stop means comprising a peripheral shoulder 20 formed in the sleeve 16 near its proximal end 17 and a peripheral protrusion 22 formed in the core 18 near its distal end 19. The shoulder 20 and protrusion 22 coact to limit the movement of the core 18 relative to the sleeve 16. As can best be seen in FIG. 4, the core 18 is axially outwardly displaced from the sleeve 16 to its point of maximum extension, the protrusion 22 abuts the shoulder 20 preventing further movement. Thus the core 18 cannot be inadvertently pulled from the sleeve 16.

The core 18 is further provided with threads 28 in its outside surface near its proximal end 21. The sleeve 16 is provided with threads 30 in its inside surface near its distal end 23 and with threads 32 in its outside surface near its proximal end 17.

Figure 3:
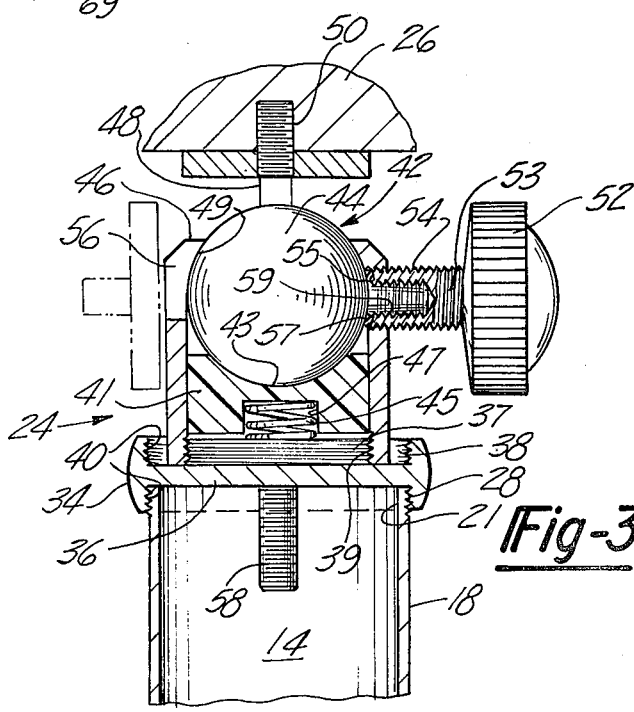
FIG. 3 is an enlarged sectional view of a preferred means of mounting a camera to the camera mounting apparatus of the invention.

Referring to FIGS. 2, 3 and 4, a camera mount 24, for removably mounting a camera 26 to the apparatus 10 is removably secured to the proximal end 21 of the core 18. The camera mount 24 is adapted to be reversibly secured to the core 18 in either a first position extending from the proximal end 21 of the core 18 exterior to the hollow interior 14 of the structure 12 (see FIG. 4), or in a second position wherein it is disposed in the interior 14 of the telescopic body structure 12 (see FIG. 2).

The camera mount 24 comprises a collet 34, having a transversely disposed partition 36 axially dividing an opening 38 through the sleeve 34 into two parts, and a pivot mount 42 connected to the partition 36. Threads 40 are formed in the interior wall surface of the collet 34 on both sides of the partition 36 and are adapted to engage the threads 28 at the proximal end 21 of the core 18 thereby securing the camera mount to the structure 10.

The pivot mount 42 comprises a ball 44 pivotally disposed within a socket housing 46. A camera mounting stud 48 is connected to and extends radially from the ball 44. The stud 48 has threads 50 to engage a complimentary threaded hole in the camera 26, thereby providing a connection for the camera to the apparatus 10.

The partition 36 is provided on one side with a large diameter threaded stud 37 for threadably mounting the socket housing 46 therein, the socket housing being provided with an appropriate internal thread 39 for that purpose. An appropriate biasing means in the form of a float member or plug 41, made of a plastic material, bronze or any other convenient material, has a spherical concave surface 43 constantly engaged with the peripheral surface of the ball 44 under the action of a compression spring 45 disposed in an appropriate pocket 47 formed in the surface of the float member 41 opposite its spherical surface 43. In this manner, the ball 44 is constantly urged with its surface in engagement with the partially spherical concave surface 49 of the socket housing 46 proximate its open end. Appropriate slots, as shown at 56, are disposed in the wall of the socket housing 46 for permitting mounting a camera in a vertical position, with the ball 44 oriented in such manner that the mounting stud 48 is disposed through a slot 56 as shown in phantom line at FIG. 3. The ball 44 may be locked in any position by means of a knob 52 having a projecting stud 53 provided with an external thread 54 engageable in a threaded bore 55 through the wall of the socket housing 46. The end of the stud 53 is provided with a resilient material washer 57 adapted to frictionally engage the surface of the ball 44 when in a locked position with the stud 53 fully threaded through the threaded bore 55. The stud 53 of the knob 52 is provided with an internally threaded blind bore 59 for threading upon the stud 58, to protect the thread, when the socket housing 46 is disposed in the stored position illustrated in FIGS. 1 and 2. The threaded stud 58 may be used as a camera mount, after removing the knob 52, when the apparatus of the present invention is utilized in a unipod mode.

Three legs 60, only one of which is shown for the sake of clarity in the drawings, are removably connected to a leg mount, such as a hub 62, which is removably secured to the distal end 23 of the sleeve 16 (see FIGS. 2, 4 and 5). The leg mounting hub 62 comprises a frustoconically or equivalently shaped first portion 64 and a cylindrically shaped second portion 66 extending coaxially from the base of the first portion 64. The second portion 66 has threads 68 formed in its wall to engage the threads 30 at the distal end 23 of the sleeve 16. The first portion 64 has three threaded sockets 69 in a circular array at equally spaced intervals, the axis of the sockets 69 being substantially perpendicular to the inclined surface of the frustoconically shaped first portion 64. The second portion 66 also has three threaded sockets 72 in a circular array at equally spaced intervals, the axis of the sockets 72 being substantially parallel to the longitudinal axis of the hub 62.

Each of the legs 60 has one threaded end 74 adapted to engage in the threaded sockets 69 and 72, and a ground engaging end 76. The legs 60 are selectively connected to the sleeve 16 via the hub 62 in either a first position, wherein they extend from the distal end 23 of the sleeve 16 exterior to the structure 12 (see FIG. 4), or in a second position, wherein they are disposed in the interior 14 of the structure 12 (see FIG. 2). In the first position, the threaded ends 74 of the legs 60 are threadably engaged in the sockets 69 in the hub 62 and the threads 68 of the second portion 66 of the hub 62 are engaged with the threads 30 of the sleeve 16. In the second position, the threaded ends 74 of the legs 60 are threadably engaged in the sockets 72 in the hub 62 and the threads 68 of the second portion 66 of the hub 62 are engaged with the threads 30 of the sleeve 16.

Referring to FIGS. 2 and 4, the core 18 and sleeve 16 are locked in either their relative extended position or retracted position, or in any intermediate position, by a locking means 77. The locking means 77 comprises a locking collar 78 and a locking ring or bushing 79. The collar 78 includes an inwardly projecting peripheral flange 80 forming a coaxially disposed clearance aperture 81 at one end of the collar 78 which is slightly larger in diameter than the core 18. The inside diamater of the collar 78 is generally equal to the outside diameter of the sleeve 16 and has threads 82 formed in its inside wall surface to engage the threads 32 in the exterior wall surface of the sleeve 16. The collar 78 also includes an annular inclined cam surface 83 extending from its inside wall surface to the free edge of the peripheral flange. The locking ring 79 has an inside diameter generally equal to the outside diameter of the core 18 and an outside diameter generally equal to the inside diameter of the collar 78. The opposite ends of the ring 79 are inclined to form to oppositely sloping cam surfaces 84 and 86 complimentary to the cam surface 83 of the collar 78.

The ring 79 receives the core 18 and is located at the juncture of the core and sleeve 18 and 16, respectively, such that the sloping cam surface 86 juts into the interstice between the core and sleeve. The core 18 projects through the clearance aperture 81 in the collar 78, and the collar 78 is disposed over the proximal end 17 of the sleeve 16. The locking collar 78 receives the locking ring 79 such that the sloping cam surface 84 of the locking ring is in juxtaposition to the cam surface 83 of the collar 78. The threads 82 of the collar 78 are engaged with the threads 32 formed in the sleeve 16 near its proximal end 17.

To lock the sleeve 16 and core 18 together to prevent relative axial movement therebetween, the collar 78 is turned in the appropriate direction with respect to the sleeve 16 to displace the collar 78 axially toward the sleeve 16. This movement causes the cam surface 83 of the collar 78 to abut the cam surface 84 of the locking ring 79 forcing the other cam surface 86 of the locking ring 79 deeper into the interstice between the sleeve 16 and inner core 18. The penetration of the locking ring cam surface 86 into the interface of the sleeve 16 and core 18 increases the frictional forces between the sleeve 16 and the locking ring 79, and between the locking ring 79 and the core 18. These frictional forces retain the sleeve and core in the desired position relative to each other. The sleeve and core 18 are unlocked permitting relative axial movement therebetween by turning the locking collar 78 in the opposite direction.

Referring to FIG. 2, to conveniently carry or store the apparatus 10, the camera 26 is removed from the apparatus 10 and carried or stored separately. The core 18 is axially displaced into the sleeve 16 and locked in position by the locking means 77. The knob 52 is removed from the threaded bore 55 through the wall of the socket housing 46 and connected to the threaded stud 58. The camera mounting means 24 is threadably connected to the free end 21 of the core 18 by the collet 34 such that the ball 44 and socket 46 of the pivot mount 42 are disposed in the second position interior 14 of the body structure 12 and the handle 52 projects outwardly of the body structure 12. The threaded ends 74 of the legs 60 are threaded into the threaded sockets 72 and disposed in their second position interior 14 of the body structure 12 and the hub 62 is threaded to the free end 23 of the outer member 16 to retain the legs 60 in place in the interior 14 of the body structure 12.

Referring to FIG. 4, to stably support the camera, the core 18 is axially displaced from the sleeve 16 to its first or extended position and locked in place by the locking means 77. The camera mount 24 is threaded to the proximal end of the core member 18 by the collet 34 such that the ball 44 and socket 46 of the camera mount 42 is in the first position extending from the proximal end 21 thereof. The camera 26 is connected to the camera mounting stud 48 and the knob 52 is threaded through the threaded bore 55 in the wall of the socket housing 46. The threaded ends 74 of the legs 60 are threaded into sockets 69 in the hub 62, and the hub 62 is threaded to the distal end 23 of the sleeve 16 such that the legs 60 are in their supporting position extending outwardly at an angle from the hub 62. The ground engaging ends of the legs 60 are placed in contact with the ground providing a stable support for the apparatus 10, and, thus, the camera 26.

It is evident from the above detailed description that the portable camera mounting apparatus is lightweight, compact and inexpensive.

The foregoing detailed description is given primarily for clarity of understanding and no unnecessary limitations should be understood therefrom for modifications will be obvious to those skilled in the art upon reading this disclosure and may be made without departing from the spirit of the invention or the scope of the appended claims.

We claim:

1. A portable camera mounting apparatus adjustable from a camera mounting position to a storage position, said apparatus comprising:
    an elongated tubular body member comprising a sleeve member and a tubular core member having a hollow interior and being telescopically extendable relative to said sleeve member, said body member having a proximal end and a distal end;
    stop means to limit the amount of extension of said core member relative to said sleeve member;
    locking means to selectively retain said core member relative to said sleeve member in an extended position, in a retracted position and in intermediate positions;
    a camera mount reversibly secured to said proximal end and for extending outwardly from said proximal end in said camera mounting position and for extending inwardly into said interior in said storage position, said camera mount comprising:
    a collet threadable on the peripheral surface of said core member at the end thereof corresponding to said proximal end,
    a transversely disposed partition in said collet, pivot mount means for supporting and orienting a camera, and means for removably connecting said pivot mount means to one side of said partition in said collet;
    a leg mount removably secured to said distal end, said leg mount having a side provided with a first plurality of peripherally spaced angularly disposed leg receiving cavities and another side provided with a second plurality of spaced parallel leg receiving cavities; and
    a plurality of legs received into said first plurality of cavities in a manner to provide a support for said body member when in a vertical position and received into said second plurality of cavities for storage in said interior.

2. An apparatus as defined in claim 1 wherein said stop means comprises:
    a shoulder formed in said sleeve member of said body member; and
    a protrusion formed on the peripheral surface of said core member engaging said shoulder when said core and sleeve members are in an extended position.

3. An apparatus as defined in claim 1, wherein said locking means comprises:
    a locking ring having an inside diameter substantially equal to the outside diameter of said core member and an outside diameter substantially equal to the outside diameter of said sleeve member, opposite ends of said locking ring being inclined to form oppositely sloping peripheral cam surfaces; and
    a locking collar having an inside diameter substantially equal to the outside diameter of said sleeve member, a peripheral inwardly extending flange at one end of said collar forming an aperture to receive therethrough the core member, and an inclined cam surface disposed interior thereto complimentary to one of said cam surfaces of said locking ring,
    said locking ring and said locking collar coacting to wedge one of said sloping cam surfaces of said locking collar into the interstice between said core and sleeve members to frictionally prevent relative telescopic movement therebetween.

4. An apparatus as defined in claim 1 wherein said leg mount further comprises:
    a first portion positioned outside said body member and coaxially disposed therewith;
    a generally cylindrically shaped second portion coaxially disposed with and extending from said first portion, said second portion being removably connected to the distal end of said body member; and
    wherein said plurality of first leg receiving apertures are disposed in said first portion, the axes of said first apertures being inclined to the longitudinal axis of said body member; and wherein said second leg receiving apertures are disposed in said second portion, the axes of said second apertures being generally parallel to the longitudinal axis of said telescopic body structure.

5. An apparatus as defined in claim 4 wherein:

said first portion of said leg mount is frustoconically shaped, its narrow diameter being distal to said apparatus; and the axes of said first leg receiving apertures are generally perpendicular to the inclined surface of said first portion.

6. An apparatus as defined in claim 5 wherein:

said plurality of first leg receiving apertures are three in number and are equally spaced in a circular array; and said plurality of second leg receiving apertures are three in number and are equally spaced from one another in a circular array; and said plurality of legs are three in number, each having one end removably receivable in said first apertures and alternatively in said second apertures.

7. An apparatus as defined in claim 6 wherein:

each of said legs has threads formed in said one end;

each of said leg receiving first apertures has threads formed in its walls to engage said threads formed in said legs; and each of said leg receiving second apertures has threads formed in its walls to engage said threads formed in said legs.

8. An apparatus as defined in claim 4 and further comprising:

threads formed in the interior wall surface of said sleeve near its distal end; and threads formed in the exterior surface of said cylindrically shaped second portion of said leg mount, which latter threads engage said threads in the distal end of said sleeve.

9. An apparatus as defined in claim 3 further comprising:

collar threads formed in the inside wall of said locking collar; and threads formed in the exterior wall surface of said sleeve member near its proximal end to engage said threads formed in said locking collar.

* * * * *